US012568125B2

(12) United States Patent
Singhal et al.

(10) Patent No.: US 12,568,125 B2
(45) Date of Patent: Mar. 3, 2026

(54) SYSTEMS AND METHODS FOR HIERARCHICAL DEEP PACKET INSPECTION FOR SCALABLE NETWORK MONITORING AND CYBER SECURITY FUNCTIONS

(71) Applicant: NetScout Systems, Inc., Westford, MA (US)

(72) Inventors: Anil K. Singhal, Carlisle, MA (US); Sanjay Munshi, Allen, TX (US)

(73) Assignee: NetScout Systems, Inc., Westford, MA (US)

( * ) Notice: Subject to any disclaimer, the term of this patent is extended or adjusted under 35 U.S.C. 154(b) by 147 days.

(21) Appl. No.: 18/619,835

(22) Filed: Mar. 28, 2024

(65) Prior Publication Data

US 2024/0333776 A1 Oct. 3, 2024

Related U.S. Application Data

(60) Provisional application No. 63/455,681, filed on Mar. 30, 2023.

(51) Int. Cl.
*H04L 29/06* (2006.01)
*H04L 9/40* (2022.01)

(52) U.S. Cl.
CPC .......... *H04L 63/306* (2013.01); *H04L 63/166* (2013.01)

(58) Field of Classification Search
CPC . H04L 63/306; H04L 63/166; H04L 63/1408; H04L 43/028; H04L 41/16
See application file for complete search history.

(56) References Cited

U.S. PATENT DOCUMENTS

| | | | | |
|---|---|---|---|---|
| 6,499,107 | B1 * | 12/2002 | Gleichauf | .......... H04L 63/0263 726/13 |
| 6,816,973 | B1 | 11/2004 | Gleichauf et al. | |
| 2014/0157405 | A1 * | 6/2014 | Joll | ..................... H04L 63/1425 726/22 |
| 2014/0341041 | A1 * | 11/2014 | Velev | ................... H04Q 3/0045 370/236 |
| 2017/0126853 | A1 * | 5/2017 | Goel | ....................... H04L 69/22 |
| 2019/0245873 | A1 | 8/2019 | Wu et al. | |
| 2020/0204574 | A1 * | 6/2020 | Christian | ................ G06F 18/23 |
| 2020/0389469 | A1 * | 12/2020 | Litichever | ............. H04W 12/12 |
| 2021/0117360 | A1 * | 4/2021 | Kutch | ................... G06F 3/0656 |
| 2021/0326175 | A1 * | 10/2021 | Herbert | ................. G06F 9/541 |
| 2022/0182398 | A1 * | 6/2022 | St. Pierre | ........... H04L 63/0236 |

(Continued)

OTHER PUBLICATIONS

Deri et al., "Using Deep Packet Inspection in CyberTraffic Analysis," 2021 IEEE International Conference on Cyber Security and Resilience (CSR), Rhodes, Greece, pp. 89-94 (Year: 2021).*

(Continued)

*Primary Examiner* — Morshed Mehedi
(74) *Attorney, Agent, or Firm* — Foley & Lardner LLP

(57) ABSTRACT

A system and method for hierarchical network monitoring functions are disclosed. An order of execution for layer functions of a network architecture is determined. The layer functions may be distributed across multiple layers. The layers may include a sensor layer, a federated application layer, and a data lake layer. A machine learning model may be executed at a first layer. The first layer may be the sensor layer.

19 Claims, 7 Drawing Sheets

(56) References Cited

U.S. PATENT DOCUMENTS

2022/0215948 A1* 7/2022 Bardot .................. G16H 40/40

OTHER PUBLICATIONS

Smallwood et al., "Intrusion analysis with deep packet inspection: Increasing efficiency of packet based investigations," 2011 International Conference on Cloud and Service Computing, Hong Kong, China, pp. 342-347 (Year: 2011).*

EP Article 94(3) EPC Communication dated Dec. 13, 2024 in EP Patent Application No. 24167530.5.

EP Extended Search Report dated Aug. 19, 2024 in European Patent Application No. 24167530.5.

AU Examination Report No. 1 on Australian Application No. 2024202057, dated Jan. 3, 2025.

CA Office Action dated Sep. 12, 2025 in Canadian Patent Application No. 3,233,877.

* cited by examiner

Figure 4:
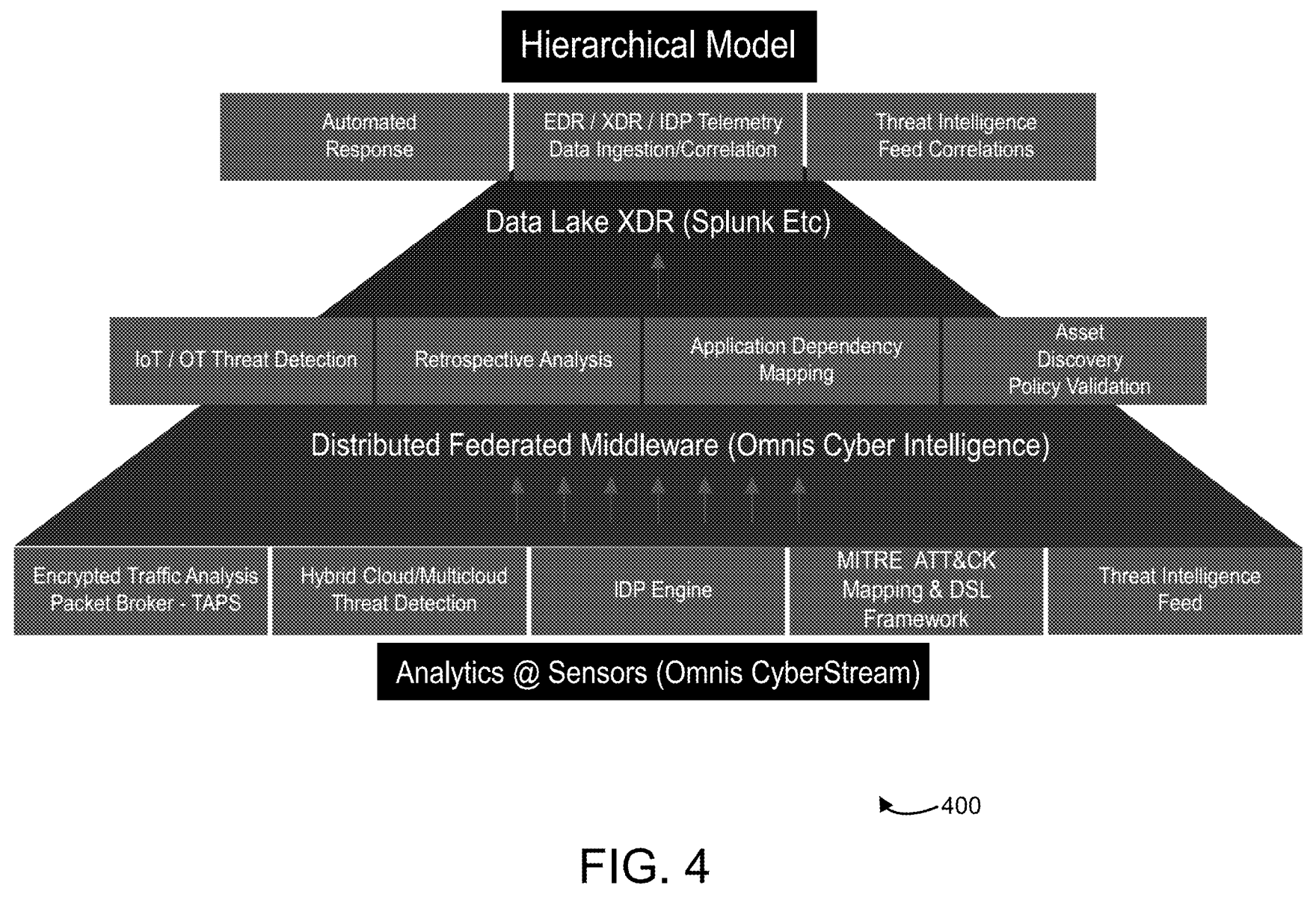

Hierarchical Model

Threat Intelligence Feed Correlations

EDR / XDR / IDP Telemetry Data Ingestion/Correlation

Automated Response

Data Lake XDR (Splunk Etc)

Asset Discovery Policy Validation

Application Dependency Mapping

Retrospective Analysis

IoT / OT Threat Detection

Distributed Federated Middleware (Omnis Cyber Intelligence)

MITRE ATT&CK Mapping & DSL Framework

Threat Intelligence Feed

IDP Engine

Hybrid Cloud/Multicloud Threat Detection

Encrypted Traffic Analysis Packet Broker - TAPS

Analytics @ Sensors (Omnis CyberStream)

Cloud 510

Software 512

Platform 514

Infrastructure 516

Network 105

Client Device 106

Client Device 106

Client Device 106

SYSTEMS AND METHODS FOR HIERARCHICAL DEEP PACKET INSPECTION FOR SCALABLE NETWORK MONITORING AND CYBER SECURITY FUNCTIONS

CROSS REFERENCE TO RELATED APPLICATION

This application claims the benefit under 35 U.S.C. § 119 (e) of the following provisional application: U.S. Provisional Ser. No. 63/455,681, entitled "SYSTEMS AND METHODS FOR HIERARCHICAL DEEP PACKET INSPECTION FOR SCALABLE NETWORK MONITORING AND CYBER SECURITY FUNCTIONS," filed Mar. 30, 2023, all of which is incorporated herein by reference in its entirety.

BACKGROUND

The present implementations relate generally to cyber security, including but not limited to network monitoring functions.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings:

FIG. 4 is a network architecture for hierarchical network monitoring functions, in accordance with an implementation;

DETAILED DESCRIPTION

Figure 1:
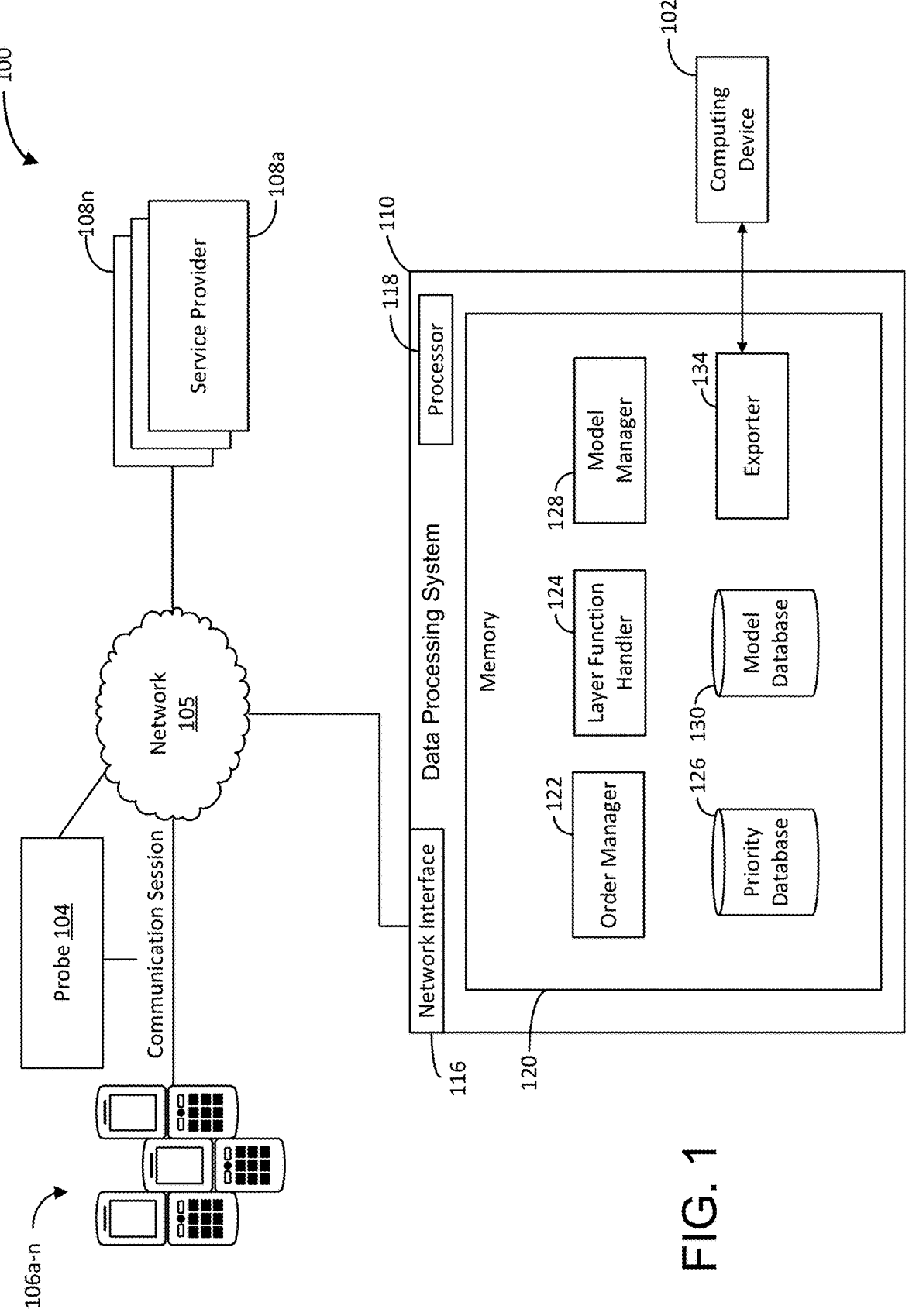
FIG. 1 is an illustration of a system hierarchical network monitoring functions, in accordance with an implementation.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

A network monitoring system may execute various layer functions. For example, the network monitoring system may support a network monitoring system method (e.g., deep packet inspection (DPI)) that utilizes various layer functions. The network monitoring system may execute the various layer functions randomly (e.g., without order, all or nothing, all at once, etc.) to monitor a network for attacks (e.g., threats, irregularities, security breaches). However, randomly performing the layer functions may result in increased power consumption, inefficient utilization of network resources, and reduced performance in detecting attacks, among other deficiencies.

A computer implementing the systems and methods described herein may overcome the aforementioned technical deficiencies. For example, the computer may operate to determine an order for executing multiple layer functions of a network architecture based on a priority for each layer function. The computer may operate to execute the layer functions according to the order. In some examples, the computer may execute a first number of layer functions at a first layer of a network architecture. The computer may execute a second number of layer functions at a second layer of the network architecture, the second number less than the first number. The computer may execute a third number of layer functions at a third layer of the network architecture, the third number less than the second number. In some cases, the layer functions may include functions to filter noise, detect threats, and allocate resources, among other functionalities.

The techniques described herein may result in various advantages over the aforementioned technical deficiencies. For example, adopting the hierarchical execution of layer functions as described herein for a network monitoring system may allow for reduced hardware (e.g., reduced rack units), power consumption by the network monitoring system, false alarms (e.g., misclassification of activity as attacks), noise for machine learning model inputs, and mean time to know (MTTK), among other advantages.

FIG. 1 illustrates an example system 100 for hierarchical network monitoring functions, in some embodiments. The system 100 may provide improved network monitoring of a network (e.g., using DPI, adaptive service intelligence (ASI)). In brief overview, the system 100 can include a probe 104 that receives and/or stores data packets transmitted via a network 105 between client devices 106a-n (hereinafter client device 106 or client devices 106) and service providers 108a-n (hereinafter service provider 108 or service providers 108). The service providers 108 can each include a set of one or more servers 602, depicted in FIG. 6A, or a data center 608. System 100 can also include a data processing system 110 that can communicate or interface with the probe 104 and/or a client device 102, either directly or via the network 105, to receive the data packets for communication sessions between the client devices 106 and the service providers 108. The data processing system 110 can collect data from the probe 104 and execute layer functions based on an order of execution. In some cases, the data processing system 110 may collect the data packets, the data, or other information about the communication sessions via the network (e.g., without the probe 104). The data processing system 110 can display various metrics, alerts, and other data at the client device 102 and/or transmit the data to the service providers 108.

The probe 104, the client devices 106, the service providers 108, the client device 102, and/or the data processing system 110 can include or execute on one or more processors or computing devices (e.g., the computing device 502 depicted in FIG. 5C) and/or communicate via the network 105. The network 105 can include computer networks such as the Internet, local, wide, metro, or other area networks, intranets, satellite networks, and other communication networks such as voice or data mobile telephone networks. The network 105 can be used to access information resources such as web pages, web sites, domain names, or uniform resource locators that can be presented, output, rendered, or displayed on at least one computing device (e.g., client device 106), such as a laptop, desktop, tablet, personal digital assistant, smart phone, portable computers, or speaker. For example, via the network 105, the client devices 106 can stream videos in video sessions provided by service providers 108 or otherwise communicate with the servers of the service providers 108 for data. In some embodiments, network 105 may be or include a self-organizing network that implements a machine learning model to automatically adjust connections and configurations of network elements of network 105 to optimize network connections (e.g., minimize latency, reduce dropped calls, increase data rate, increase quality of service, etc.).

Each of the probe 104, the client devices 106, the service providers 108, the client device 102, and/or the data processing system 110 can include or utilize at least one processing unit or other logic device such as programmable logic array engine, or module configured to communicate with one another or other resources or databases. The components of the probe 104, the client devices 106, the service providers 108, the client device 102, and/or the data processing system 110 can be separate components or a single component. System 100 and its components can include hardware elements, such as one or more processors, logic devices, or circuits.

Still referring to FIG. 1, and in further detail, system 100 can include the service providers 108. The service providers 108 may each be or include servers or computers configured to transmit or provide services across network 105 to client devices 106. The service providers 108 may transmit or provide such services upon receiving requests for the services from any of the client devices 106. The term "service" as used herein includes the supplying or providing of information over a network and is also referred to as a communications network service. Examples of services include 5G broadband services, any voice, data or video service provided over a network, smart-grid network, digital telephone service, cellular service, Internet protocol television (IPTV), etc.

Client devices 106 can include or execute applications to receive data from the service providers 108. For example, a client device 106 may execute a video application upon receiving a user input selection that causes the client device 106 to open the video application on the display. Responsive to executing the video application, a service provider 108 associated with the video application may stream a requested video to the client device 106 in a communication session. In another example, a client device 106 may execute a video game application. Responsive to executing the video game application, a service provider 108 associated with the video game application may provide data for the video game application to the client device 106. The client devices 106 may establish communication sessions with the service providers 108 for any type of application or for any type of call.

A client device 106 can be located or deployed at any geographic location in the network environment depicted in FIG. 1. A client device 106 can be deployed, for example, at a geographic location where a typical user using the client device 106 would seek to connect to a network (e.g., access a browser or another application that requires communication across a network). For example, a user can use a client device 106 to access the Internet at home, as a passenger in a car, while riding a bus, in the park, at work, while eating at a restaurant, or in any other environment. The client device 106 can be deployed at a separate site, such as an availability zone managed by a public cloud provider (e.g., a cloud 610 depicted in FIG. 6B). If the client device 106 is deployed in a cloud 610, the client device 106 can include or be referred to as a virtual client device or virtual machine. In the event the client device 106 is deployed in a cloud 610, the packets exchanged between the client device 106 and the service providers 108 can still be retrieved by probe 104 from the network 105. The client device 102 may be similar to client devices 106. In some cases, the probe 104, the client devices 106, and/or the data processing system 110 can be deployed in the cloud 610 on the same computing host in an infrastructure 616 (described below with respect to FIG. 6B).

As service providers 108 provide or transmit data in communication sessions to client devices 106, the probe 104 may intercept or otherwise monitor the control plane signaling data (e.g., control plane signaling data packets) of the communication sessions. The probe 104 may comprise one or more processors that are connected to a network equipment manufacture (NEM) trace port of network 105. In some embodiments, the probe 104 may collect control plane signaling data at an Evolved Packet Core interface (e.g., the SI-MME interface or the S6a interface) of the network 105. The control plane signaling data may include geographical location data (e.g., cell tower triangulation data or global positioning system data) of the client devices 106 as client devices 106 receive data and/or transmit, a cell identifier identifying the cell in which the respective client device 106 was located while transmitting or receiving the data, a device identifier (e.g., IMSI, MAC address, IP address, etc.) of the client device 106, dropped calls (e.g., disconnects from the streaming video provider), MAC PHY bandwidth, number of resource connection procedures a second, reference signals received power (RSRP), reference signal received quality (RSRQ), carrier to interference and noise ratio (CINR), handover information, timestamps indicating when the data was collected or generated, etc. The probe 104 may receive such data and forward the data to the data processing system 110 over the network 105 for further processing.

Data processing system 110 may comprise one or more processors that are configured to determine an order for executing layer functions and executing the layer functions according to the order. The data processing system 110 may comprise a network interface 116, a processor 118, and/or memory 120. Data processing system 110 may communicate with any of the client device 102, the probe 104, the client devices 106, and/or the service providers 108 via the network interface 116. The processor 118 may be or include an ASIC, one or more FPGAs, a DSP, circuits containing one or more processing components, circuitry for supporting a microprocessor, a group of processing components, or other suitable electronic processing components. In some embodiments, the processor 118 may execute computer code or modules (e.g., executable code, object code, source code, script code, machine code, etc.) stored in the memory 120 to facilitate the operations described herein. The memory 120 may be any volatile or non-volatile computer-readable storage medium capable of storing data or computer code.

Memory 120 may include an order manager 122, a layer function handler 124, a priority database 126, a model manager 128, a model database 130, and an exporter 134, in some embodiments. In brief overview, the components 122-134 may comprise programmable instructions that, upon execution, cause the processor 118 to execute one or more layer functions according to an order. The layer functions may be ordered based on respective priorities for each layer function. The layer functions may be included in one or more layers of a network architecture. The one or more layers may include respective quantities of layer functions. For example, a first layer may include a first quantity of layer functions, a second layer may include a second quantity of layer functions less than the first quantity, and a third layer may include a third quantity of layer functions less than the second quantity.

The priority database 126 and the model database 130 may be a database (e.g., relational, non-relational, object oriented) that stores the respective priorities and data for machine learning models, respectively, among other potential data. In some examples, the data processing system 110 may store the data in memory (e.g., memory 120) instead of the priority database 126 or the model database 130. The data processing system 110, the processor 118, and/or another component of the memory 120 may retrieve data from the priority database 126 or the model database 130 to determine the order for executing the layer functions or execute a machine learning model, among other uses.

The exporter 134 may comprise executable instructions that, upon execution by the processor 118, may export the generated data from execution of the layer functions and/or the machine learning model (e.g., generated data), to the computing device 102. For example, the exporter 134 may create an exportable file (e.g., a file with a format such as BIL, GRD/TAB, PNG, ASKII, KMZ, etc.) from the generated data and transmit the exportable file to the computing device 102 for display. The exporter 134 may transmit the exportable file to the computing device 102 responsive to a request from the computing device 102. In some embodiments, the exporter 136 may generate and/or export exportable files to the computing device 102 at set intervals to provide the computing device 102 with real-time updates of the performance of communication sessions between nodes.

Figures 2A, 2B:
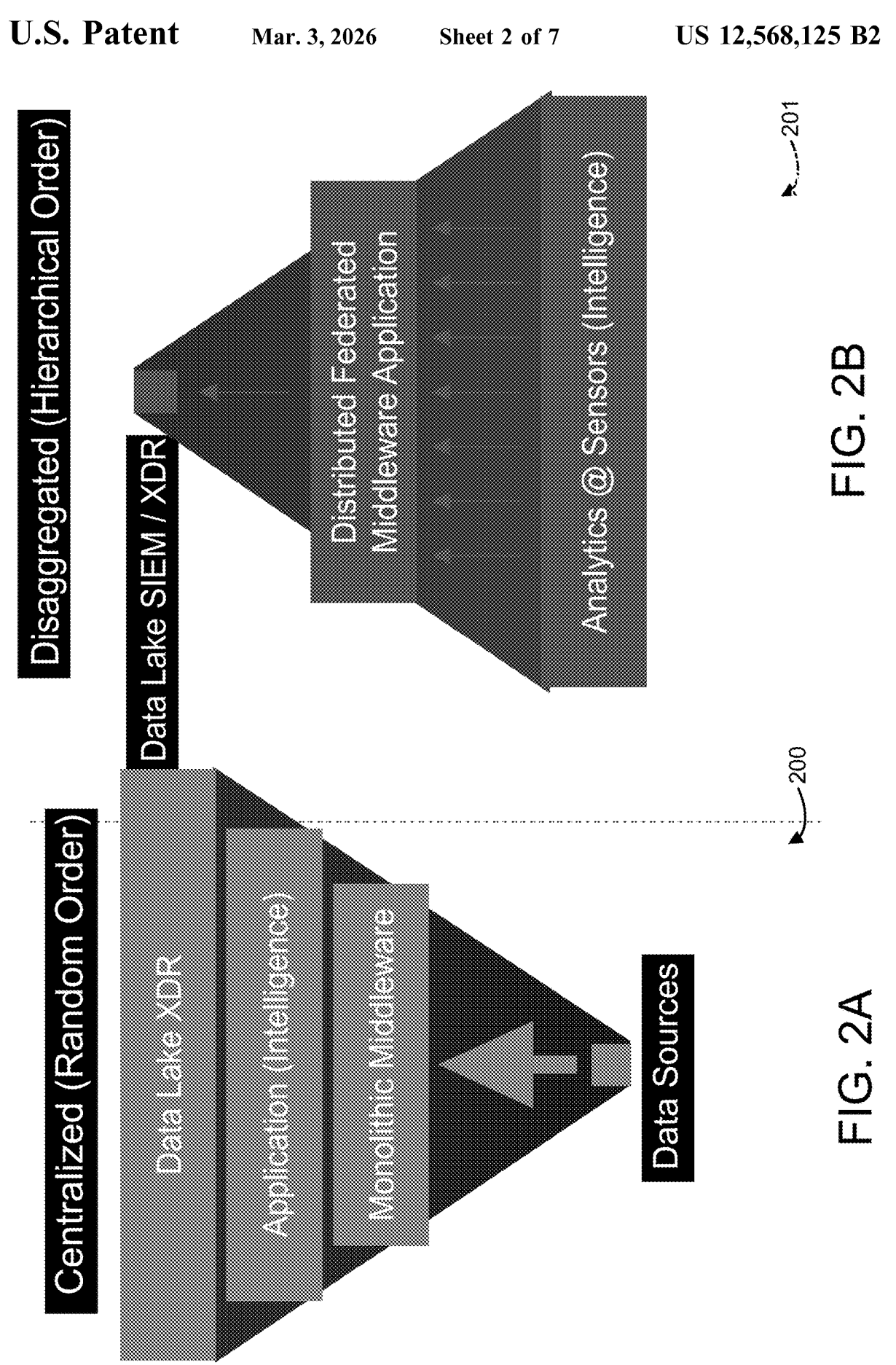
FIGS. 2A and 2B are illustrations of network architectures, in accordance with an implementation.

FIGS. 2A and 2B are illustrations of network architectures 200 and 201 respectively, in accordance with present implementations. In some cases, the network architectures 200 and 201 may include various layers. In some cases, each layer may include layer functions.

Referring to FIG. 2A, the network architecture 200 may include a monolithic layer, an application layer, and a data lake layer. A majority of the layer functions may be included in the data lake layer. A network monitoring system supporting the network architecture 200 may perform the layer functions of the network architecture 200 at random (e.g., without priority). Network packets may be communicated across the networks 200.

Referring to FIG. 2B, the network architecture 201 may include a sensor layer, a federated application layer, and a data lake layer. A majority of the layer functions may be included in the sensor layer. A network monitoring system supporting the network architecture 201 may execute the layer functions of the network architecture 201 according to an order (e.g., a hierarchy). For example, the network architecture 201 may include a first type of layer function at a first layer based on a priority associated with the first type of layer function. The network architecture 201 may include a second type of layer function at a second layer based on a priority associated with the second type of layer. Similarly, the network architecture 201 may include each layer function at a respective layer. In some cases, the first layer may include a first quantity of layer functions greater than a second quantity of layer functions included in the second layer and the second quantity of layer functions may be greater than a third quantity of layer functions included in the third layer. In some examples, the network monitoring system may execute each layer separately. In some examples, the network monitoring system may execute each layer function of each layer based on a priority of each layer function. The priority of each layer function may be configured (e.g., pre-configured, configured by the network monitoring system, configured by an operator).

Techniques described herein may provide for ML-powered analytics at source of capture to convert behavioral-based analysis into deterministic signatures that may produce a reduction in false positives. Continuous capture and local storage of metadata and packets before, during, after an alert, may enable increased retrospective analysis, investigation, and proactive hunting to detect threats that may have been missed otherwise.

Figure 3:
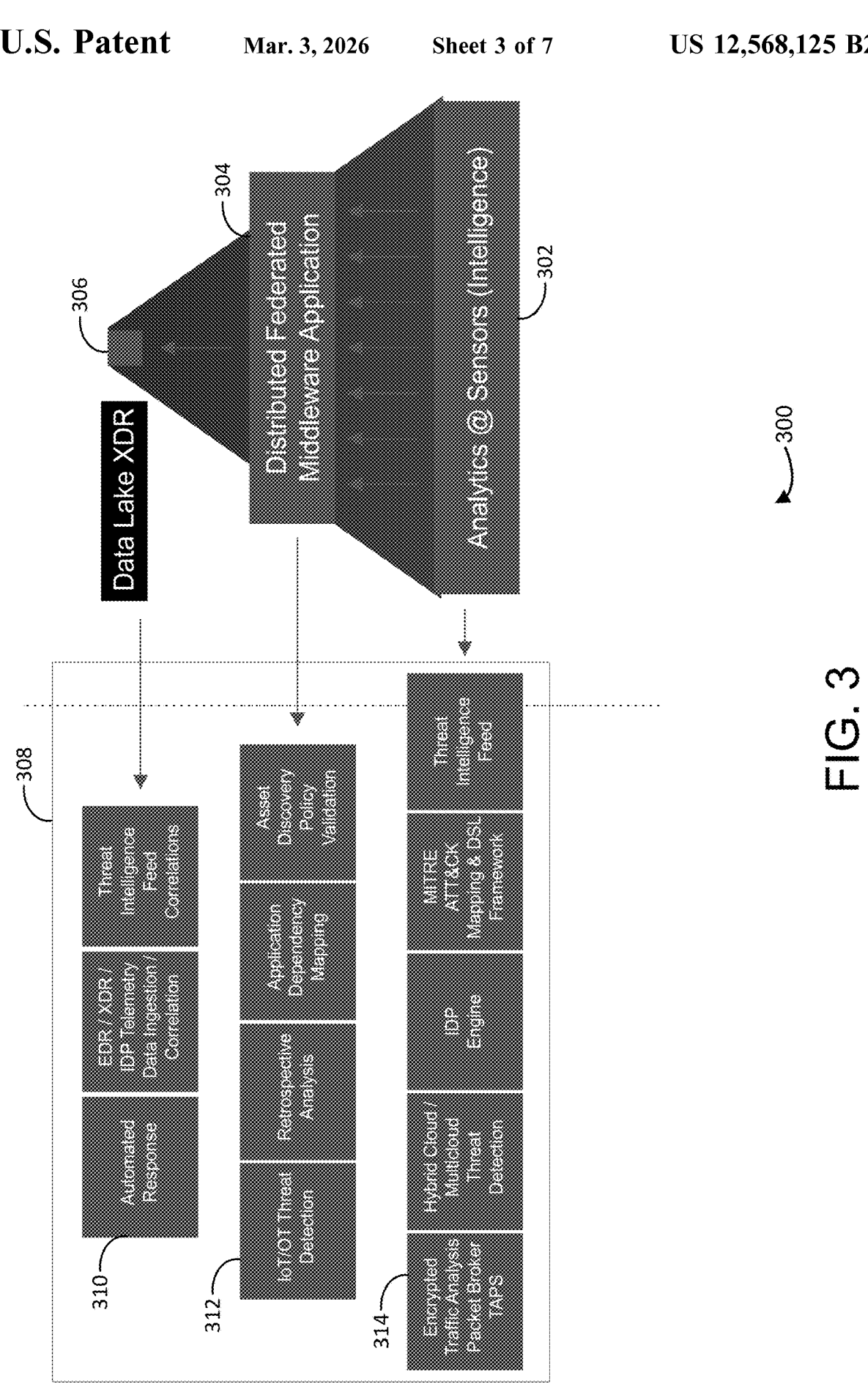
FIG. 3 is a network architecture for hierarchical network monitoring functions, in accordance with an implementation.

FIG. 3 is a network architecture 300 for hierarchical network monitoring functions, in accordance with an implementation. The network architecture 300 may include a first layer 302, a second layer 304, and a third layer 306. Each of the layers 302, 304, and 306 may include one or more layer functions 308. In some cases, the first layer 302 may be a sensor layer, the second layer 304 may be a federated application layer, and the third layer 306 may be a data lake layer. In some cases, the first layer 302 may include a first quantity 314 of layer functions, the second layer 304 may include a second quantity 312 of layer functions, and the third layer 306 may include a third quantity 310 of layer functions. In some examples, the network architecture 300 may include more or fewer layers and more or fewer layer functions.

In some cases, the network architecture may be an ASI architecture. The ASI architecture may comprise four layers. Packets may be stored in an intelligent manner that retains the important and actionable portions of packets with the option to discard less important parts. Session records store information about individual protocol transactions. This information is therefore protocol specific. Examples include the results of a DNS request or the URL and browser information in an HTTP request. A conversation layer may include information about who was talking to whom and on what protocol or application. Finally, "KxI" information may provide a compact, but actionable summary about the traffic activity on the network, the servers discovered on the network, the clients accessing the servers, and the performance of the applications and services provided by the servers. Degraded performance is often an early indicator of suspicious activity on a network.

FIG. 4 is a network architecture 400 for hierarchical network monitoring functions, in accordance with an implementation. The network architecture 400 may be a hierarchical architecture and may include a first layer, a second layer, and a third layer. Each layer may include one or more layer functions. Each layer function may be ordered based on a respective priority. In some cases, each layer may include a respective quantity of layer functions. In some examples, the first layer may be a sensor layer for Omnis CyberStream, the second layer may be a federated application layer for Omnis Cyber Intelligence, and the third layer may be a data lake layer for Splunk.

In some cases, the network architecture 400 may support an Omnis network security. The Omnis network security may be a hierarchical DPI or a hierarchical ASI based networks analytics and visibility (NAV). At the foundation of the Omnis network security are InfiniStream and/or new CyberStream network instrumentation which use Deep Packet Inspection and ASI to convert raw packets into layer 2-7 metadata. The Omnis network may support a Visibility Without Borders platform that may conduct DPI at an increased scale and provide network visibility for a digital infrastructure of an organization.

The Omnis Network Security may perform various functions. For example, the Omnis network security may provide Real-time Analytics at Source, Rapid Retrospective Analysis, and Ecosystem Integration. The real-time analytics at source may support machine learning (ML)-powered analytics at source of packet capture, which may reduce an amount of data sent to centralized cloud/SIEM for analysis, avoiding privacy issues. The real-time analytics at source may use multiple methods of real-time vulnerability and threat detection, such as matching IoCs from ATLAS Intelligence Feed and/or other feeds, Matching Suricata-based rules and signatures, ASI Flow (e.g., a form of Long Short-Term Memory (LSTM) machine learning that conducts network behavioral analysis that is deterministic and reduces false positives), and, when a threat is detected, OCI maps to known Mitre Att&ck TTPs to support further analysis.

The rapid retrospective analysis may support continuous capture and storage of metadata and associated packet decodes on the ISNG/CyberSteam network instrumentation. The capture and storage may support conducting forensic investigation of real-time and historical data to reduce false positives, validate and provide evidence of threats, and reduce MTTR. The rapid retrospective analysis may support retrospectively applying threat intelligence to historical metadata or searching for undetected cyberthreats that may have been missed by cybersecurity stack.

The ecosystem integration may support integrating into a cybersecurity ecosystem (e.g., a previously existing ecosystem). For example, integrations with SIEM, SOAR, XDR, (IPAM, CMDB) may improve threat detection, investigation, and incident response. The portfolio of taps, packet brokers, and decryption appliances can be leveraged by the security ecosystem. The ecosystem integration can be used to Validate Zero-trust policy compliance. Locally stored metadata and packets can be exported for custom enrichment and analysis.

Figure 5A:
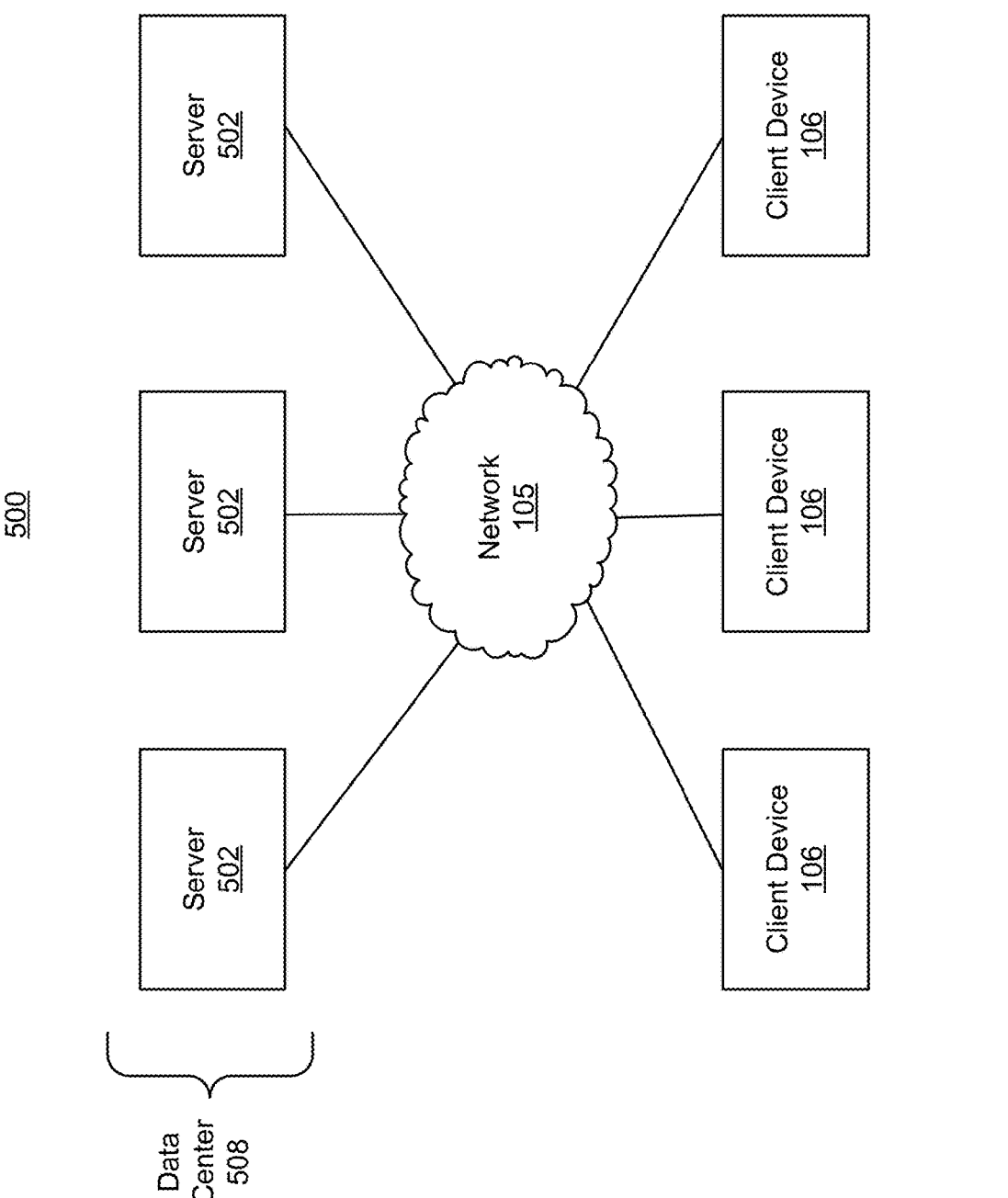
FIG. 5A is a block diagram depicting an implementation of a network environment including a client device in communication with a server device.

FIG. 5A depicts an example network environment that can be used in connection with the methods and systems described herein. In brief overview, the network environment 500 includes one or more client devices 106 (also generally referred to as clients, client node, client machines, client computers, client computing devices, endpoints, or endpoint nodes) in communication with one or more servers 502 (also generally referred to as servers, nodes, or remote machine) via one or more networks 105. In some embodiments, a client 106 has the capacity to function as both a client node seeking access to resources provided by a server and as a server providing access to hosted resources for other client devices 106.

Although FIG. 5A shows a network 105 between the client devices 106 and the servers 502, the client devices 106 and the servers 502 can be on the same network 105. In embodiments, there are multiple networks 105 between the client devices 106 and the servers 502. The network 105 can include multiple networks such as a private network and a public network. The network 105 can include multiple private networks.

The network 105 can be connected via wired or wireless links. Wired links can include Digital Subscriber Line (DSL), coaxial cable lines, or optical fiber lines. The wireless links can include BLUETOOTH, Wi-Fi, Worldwide Interoperability for Microwave Access (WiMAX), an infrared channel or satellite band. The wireless links can also include any cellular network standards used to communicate among mobile devices, including standards that qualify as 1G, 2G, 3G, 4G, 5G or other standards. The network standards can qualify as one or more generation of mobile telecommunication standards by fulfilling a specification or standards such as the specifications maintained by International Telecommunication Union. Examples of cellular network standards include AMPS, GSM, GPRS, UMTS, LTE, LTE Advanced, Mobile WiMAX, and WiMAX-Advanced. Cellular network standards can use various channel access methods e.g. FDMA, TDMA, CDMA, or SDMA. In some embodiments, different types of data can be transmitted via different links and standards. In other embodiments, the same types of data can be transmitted via different links and standards.

The network 105 can be any type and/or form of network. The geographical scope of the network 105 can vary widely and the network 105 can be a body area network (BAN), a personal area network (PAN), a local-area network (LAN), e.g. Intranet, a metropolitan area network (MAN), a wide area network (WAN), or the Internet. The topology of the network 105 can be of any form and can include, e.g., any of the following: point-to-point, bus, star, ring, mesh, or tree. The network 105 can be an overlay network which is virtual and sits on top of one or more layers of other networks 105. The network 105 can be of any such network topology as known to those ordinarily skilled in the art capable of supporting the operations described herein. The network 105 can utilize different techniques and layers or stacks of protocols, including, e.g., the Ethernet protocol or the internet protocol suite (TCP/IP). The TCP/IP internet protocol suite can include application layer, transport layer, internet layer (including, e.g., IPv6), or the link layer. The network 105 can be a type of a broadcast network, a telecommunications network, a data communication network, or a computer network.

The network environment 500 can include multiple, logically grouped servers 502. The logical group of servers can be referred to as a data center 508 (or server farm or machine farm). In embodiments, the servers 502 can be geographically dispersed. The data center 508 can be administered as a single entity or different entities. The data center 508 can include multiple data centers 508 that can be geographically dispersed. The servers 502 within each data center 508 can be homogeneous or heterogeneous (e.g., one or more of the servers 502 or machines 502 can operate according to one type of operating system platform (e.g., WINDOWS NT, manufactured by Microsoft Corp. of Redmond, Washington), while one or more of the other servers 502 can operate on according to another type of operating system platform (e.g., Unix, Linux, or Mac OS X)). The servers 502 of each data center 508 do not need to be physically proximate to another server 502 in the same machine farm 508. Thus, the group of servers 502 logically grouped as a data center 508 can be interconnected using a network. Management of the data center 508 can be de-centralized. For example, one or more servers 502 can comprise components, subsystems and modules to support one or more management services for the data center 508.

Server 502 can be a file server, application server, web server, proxy server, appliance, network appliance, gateway, gateway server, virtualization server, deployment server, SSL VPN server, or firewall. In embodiments, the server 502 can be referred to as a remote machine or a node. Multiple nodes can be in the path between any two communicating servers.

Figure 5B:
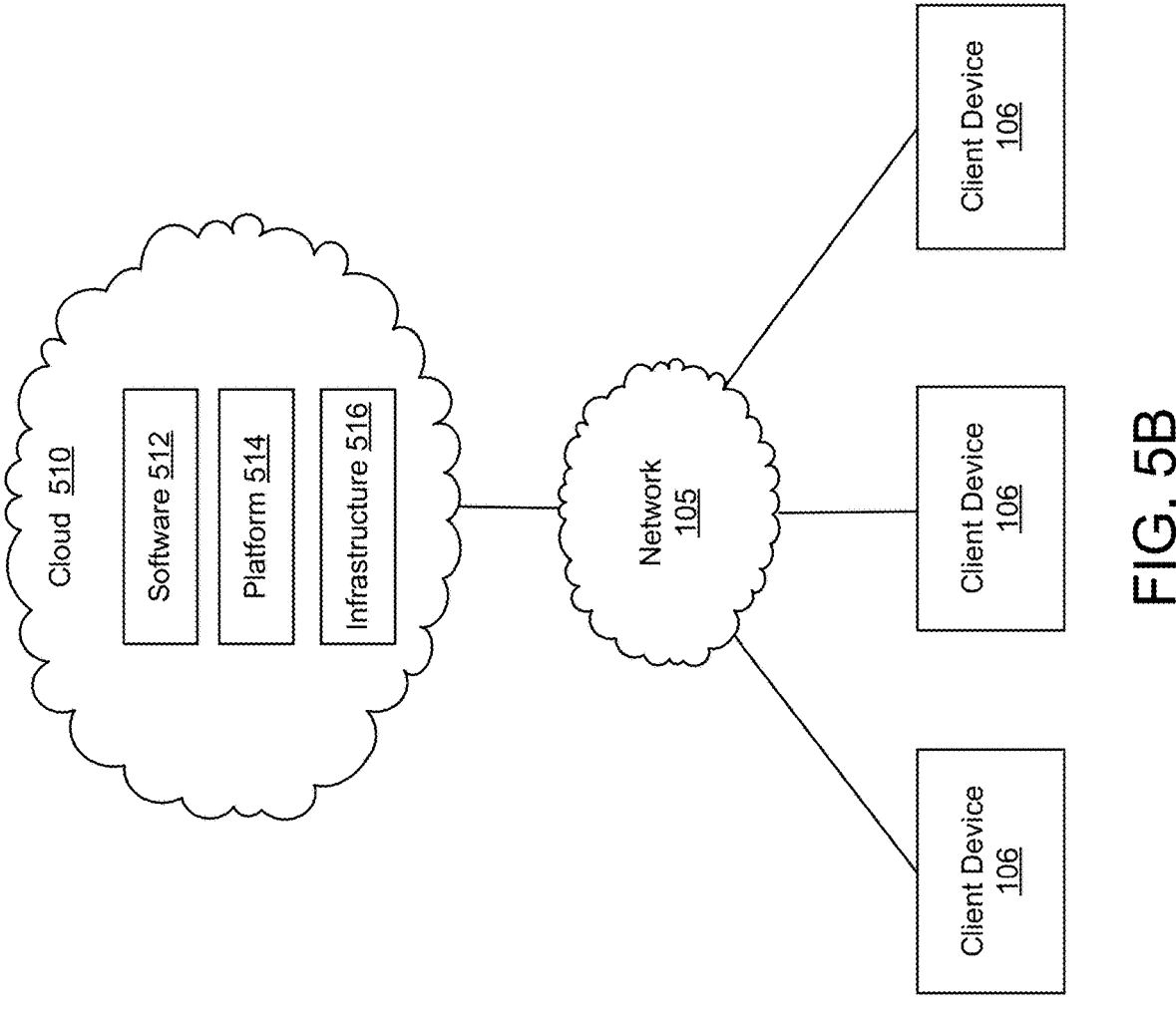
FIG. 5B is a block diagram depicting a cloud computing environment including a client device in communication with cloud service providers.

FIG. 5B illustrates an example cloud computing environment. A cloud computing environment 501 can provide client 104 with one or more resources provided by a network environment. The cloud computing environment 501 can include one or more client devices 106, in communication with the cloud 510 over one or more networks 105. Client devices 106 can include, e.g., thick clients, thin clients, and zero clients. A thick client can provide at least some functionality even when disconnected from the cloud 510 or servers 502. A thin client or a zero client can depend on the connection to the cloud 510 or server 502 to provide functionality. A zero client can depend on the cloud 510 or other networks 105 or servers 502 to retrieve operating system data for the client device. The cloud 510 can include back end platforms, e.g., servers 502, storage, server farms or data centers.

The cloud 510 can be public, private, or hybrid. Public clouds can include public servers 502 that are maintained by third parties to the client devices 106 or the owners of the clients. The servers 502 can be located off-site in remote geographical locations as disclosed above or otherwise. Public clouds can be connected to the servers 502 over a public network. Private clouds can include private servers 502 that are physically maintained by client devices 106 or owners of clients. Private clouds can be connected to the servers 502 over a private network 105. Hybrid clouds 508 can include both the private and public networks 105 and servers 502.

The cloud 510 can also include a cloud-based delivery, e.g. Software as a Service (SaaS) 512, Platform as a Service (PaaS) 514, and the Infrastructure as a Service (IaaS) 516. IaaS can refer to a user renting the use of infrastructure resources that are needed during a specified time period. IaaS providers can offer storage, networking, servers or virtualization resources from large pools, allowing the users to quickly scale up by accessing more resources as needed. PaaS providers can offer functionality provided by IaaS, including, e.g., storage, networking, servers or virtualization, as well as additional resources such as, e.g., the operating system, middleware, or runtime resources. SaaS providers can offer the resources that PaaS provides, including storage, networking, servers, virtualization, operating system, middleware, or runtime resources. In some embodiments, SaaS providers can offer additional resources including, e.g., data and application resources.

Client devices 106 can access IaaS resources, SaaS resources, or PaaS resources. In embodiments, access to IaaS, PaaS, or SaaS resources can be authenticated. For example, a server or authentication server can authenticate a user via security certificates, HTTPS, or API keys. API keys can include various encryption standards such as, e.g., Advanced Encryption Standard (AES). Data resources can be sent over Transport Layer Security (TLS) or Secure Sockets Layer (SSL).

The client 106 and server 502 can be deployed as and/or executed on any type and form of computing device, e.g. a computer, network device or appliance capable of communicating on any type and form of network and performing the operations described herein.

Figure 5C:
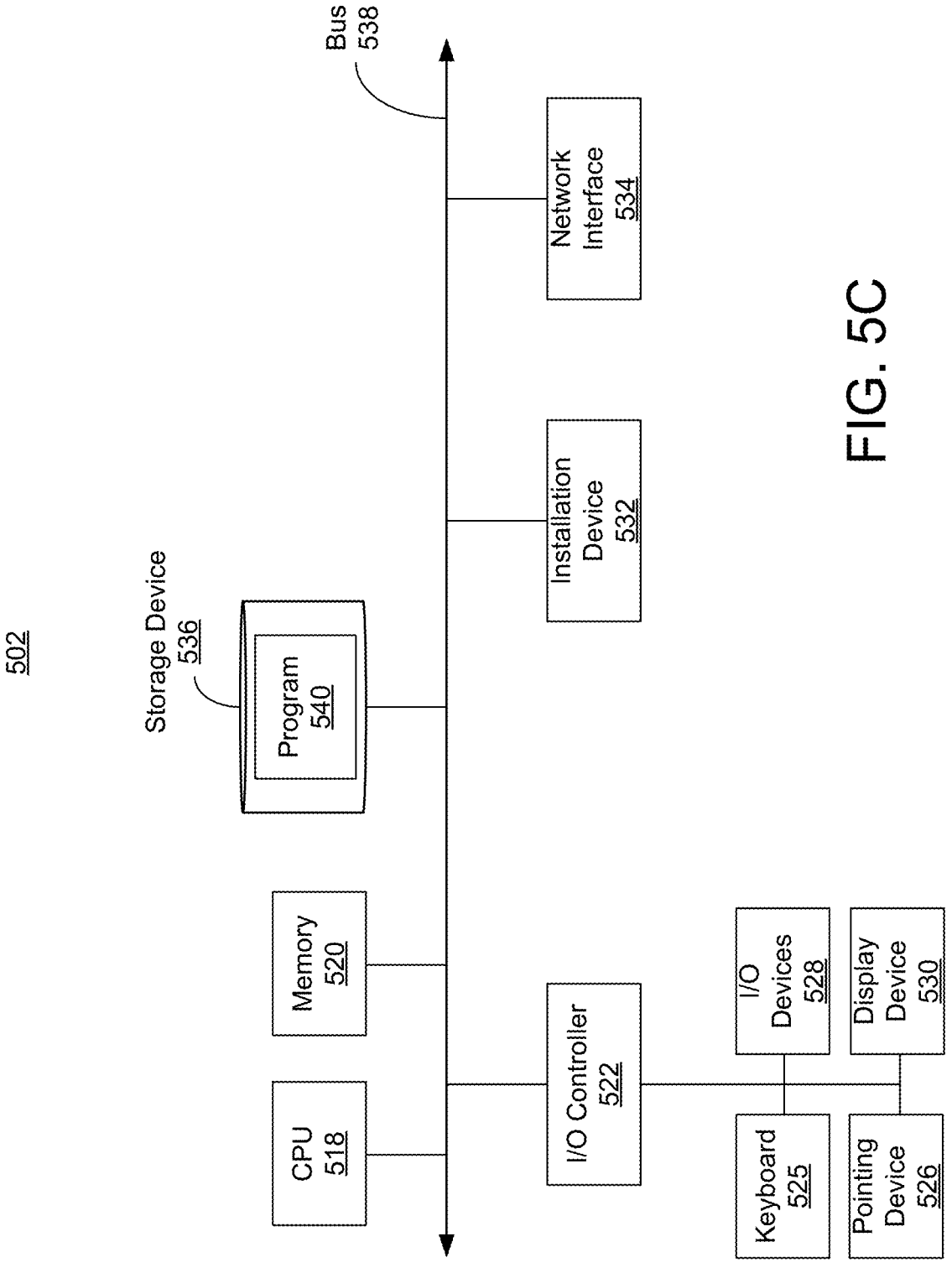
FIG. 5C is a block diagram depicting an implementation of a computing device that can be used in connection with the systems depicted in FIGS. 1, 5A and 5B.

FIG. 5C depicts block diagrams of a computing device 502 useful for practicing an embodiment of the client 106 or a server 502. As shown in FIG. 5C, each computing device 502 can include a central processing unit 518, and a main memory unit 520. As shown in FIG. 5C, a computing device 502 can include one or more of a storage device 536, an installation device 532, a network interface 534, an I/O controller 522, a display device 530, a keyboard 524 or a pointing device 526, e.g. a mouse. The storage device 536 can include, without limitation, a program 540, such as an operating system, software, or software associated with system 100.

The central processing unit 518 is any logic circuitry that responds to and processes instructions fetched from the main memory unit 520. The central processing unit 518 can be provided by a microprocessor unit, e.g.: those manufactured by Intel Corporation of Mountain View, California. The computing device 502 can be based on any of these processors, or any other processor capable of operating as described herein. The central processing unit 518 can utilize instruction level parallelism, thread level parallelism, different levels of cache, and multi-core processors. A multi-core processor can include two or more processing units on a single computing component.

Main memory unit 520 can include one or more memory chips capable of storing data and allowing any storage location to be directly accessed by the microprocessor 518. Main memory unit 520 can be volatile and faster than storage 536 memory. Main memory units 520 can be Dynamic random access memory (DRAM) or any variants, including static random access memory (SRAM). The memory 520 or the storage 536 can be non-volatile; e.g., non-volatile read access memory (NVRAM). The memory 520 can be based on any type of memory chip, or any other available memory chips. In the example depicted in FIG. 5C, the processor 518 can communicate with memory 520 via a system bus 538.

A wide variety of I/O devices 528 can be present in the computing device 502. Input devices 528 can include keyboards, mice, trackpads, trackballs, touchpads, touch mice, multi-touch touchpads and touch mice, microphones, multi-array microphones, drawing tablets, cameras, or other sensors. Output devices can include video displays, graphical displays, speakers, headphones, or printers.

I/O devices 528 can have both input and output capabilities, including, e.g., haptic feedback devices, touchscreen displays, or multi-touch displays. Touchscreen, multi-touch displays, touchpads, touch mice, or other touch sensing devices can use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices can allow two or more contact points with the surface, allowing advanced functionality including, e.g., pinch, spread, rotate, scroll, or other gestures. Some touchscreen devices, including, e.g., Microsoft PIXELSENSE or Multi-Touch Collaboration Wall, can have larger surfaces, such as on a table-top or on a wall, and can also interact with other electronic devices. Some I/O devices 528, display devices 530 or group of devices can be augmented reality devices. The I/O devices can be controlled by an I/O controller 522 as shown in FIG. 5C. The I/O controller 522 can control one or more I/O devices, such as, e.g., a keyboard 524 and a pointing device 526, e.g., a mouse or optical pen. Furthermore, an I/O device can also provide storage and/or an installation device 532 for the computing device 502. In embodiments, the computing device 502 can provide USB connections (not shown) to receive handheld USB storage devices. In embodiments, an I/O device 528 can be a bridge between the system bus 538 and an external communication bus, e.g. a USB bus, a SCSI bus, a FireWire bus, an Ethernet bus, a Gigabit Ethernet bus, a Fibre Channel bus, or a Thunderbolt bus.

In embodiments, display devices 530 can be connected to I/O controller 522. Display devices can include, e.g., liquid crystal displays (LCD), electronic papers (e-ink) displays, flexile displays, light emitting diode displays (LED), or other types of displays. In some embodiments, display devices 530 or the corresponding I/O controllers 522 can be controlled through or have hardware support for OPENGL or DIRECTX API or other graphics libraries. Any of the I/O devices 528 and/or the I/O controller 522 can include any type and/or form of suitable hardware, software, or combination of hardware and software to support, enable or provide for the connection and use of one or more display devices 530 by the computing device 502. For example, the computing device 502 can include any type and/or form of video adapter, video card, driver, and/or library to interface, communicate, connect or otherwise use the display devices 530. In embodiments, a video adapter can include multiple connectors to interface to multiple display devices 530.

The computing device 502 can include a storage device 536 (e.g., one or more hard disk drives or redundant arrays of independent disks) for storing an operating system or other related software, and for storing application software programs 540 such as any program related to the systems, methods, components, modules, elements, or functions depicted in FIG. 1, or 2. Examples of storage device 536 include, e.g., hard disk drive (HDD); optical drive including CD drive, DVD drive, or BLU-RAY drive; solid-state drive (SSD); USB flash drive; or any other device suitable for storing data. Storage devices 536 can include multiple volatile and non-volatile memories, including, e.g., solid state hybrid drives that combine hard disks with solid state cache. Storage devices 536 can be non-volatile, mutable, or read-only. Storage devices 536 can be internal and connect to the computing device 502 via a bus 538. Storage device 536 can be external and connect to the computing device 502 via an I/O device 530 that provides an external bus. Storage device 536 can connect to the computing device 502 via the network interface 534 over a network 105. Some client devices 106 may not require a non-volatile storage device 536 and can be thin clients or zero client devices 106. Some storage devices 536 can be used as an installation device 532 and can be suitable for installing software and programs.

The computing device 502 can include a network interface 534 to interface to the network 105 through a variety of connections including, but not limited to, standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMax and direct asynchronous connections). The computing device 502 can communicate with other computing devices 502 via any type and/or form of gateway or tunneling protocol e.g. Secure Socket Layer (SSL) or Transport Layer Security (TLS), QUIC protocol, or the Citrix Gateway Protocol manufactured by Citrix Systems, Inc. of Ft. Lauderdale, Florida. The network interface 534 can include a built-in network adapter, network interface card, PCMCIA network card, EXPRESSCARD network card, card bus network adapter, wireless network adapter, USB network adapter, modem or any other device suitable for interfacing the computing device 502 to any type of network capable of communication and performing the operations described herein.

A computing device 502 of the sort depicted in FIG. 5C can operate under the control of an operating system, which controls scheduling of tasks and access to system resources. The computing device 502 can be running any operating system configured for any type of computing device, including, for example, a desktop operating system, a mobile device operating system, a tablet operating system, or a smartphone operating system.

The computing device 502 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computing device 502 has sufficient processor power and memory capacity to perform the operations described herein. In some embodiments, the computing device 502 can have different processors, operating systems, and input devices consistent with the device.

In embodiments, the status of one or more machines 106, 502 in the network 105 can be monitored as part of network management. In embodiments, the status of a machine can include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information can be identified by a plurality of metrics, and the plurality of metrics can be applied at least in part towards decisions in load distribution, network traffic management, and network failure recovery as well as any aspects of operations of the present solution described herein.

The processes, systems and methods described herein can be implemented by the computing device 502 in response to the CPU 518 executing an arrangement of instructions contained in main memory 520. Such instructions can be read into main memory 520 from another computer-readable medium, such as the storage device 536. Execution of the arrangement of instructions contained in main memory 520 causes the computing device 502 to perform the illustrative processes described herein. One or more processors in a multi-processing arrangement may also be employed to execute the instructions contained in main memory 520. Hard-wired circuitry can be used in place of or in combination with software instructions together with the systems and methods described herein. Systems and methods described herein are not limited to any specific combination of hardware circuitry and software.

Although an example computing system has been described in FIG. 5, the subject matter including the operations described in this specification can be implemented in other types of digital electronic circuitry, or in computer software, firmware, or hardware, including the structures disclosed in this specification and their structural equivalents, or in combinations of one or more of them.

The description relates to a network monitoring system that may collect data packets that are transmitted across communication sessions. A computer of the network monitoring system may perform layer functions at each layer of a network architecture according to an order. In some cases, layers may include a first layer, a second layer, and a third layer. Each respective layer may include one or more layer functions. In some cases, the first layer includes more layer functions than the second layer, which includes more layer functions than the third layer. The order may be based on respective priorities for each layer function. In some cases, the priorities may be set by an operator (e.g., practitioner). The computer may generate the order. The first layer may be a sensor layer, the second layer may be a federated application layer, and the third layer may be a data lake layer. The computer may execute a machine learning model at the first layer.

At least one aspect of a technical solution to the aforementioned problem is directed to a method. The method may comprise determining an order for executing multiple layer functions of a network architecture based on a priority for each layer function; and executing the multiple layer functions according to the order.

At least one aspect of this technical solution is directed to a system. The system may comprise one or more processors. The one or more processors may determine an order for executing multiple layer functions of a network architecture based on a priority for each layer function; and execute the multiple layer functions according to the order.

At least one aspect of this technical solution is directed to a non-transitory computer-readable storage medium storing executable instructions that, when executed by one or more processors, cause the one or more processors to determine an order for executing multiple layer functions of a network architecture based on a priority for each layer function; and execute the multiple layer functions according to the order.

The foregoing detailed description includes illustrative examples of various aspects and implementations and provides an overview or architecture for understanding the nature and character of the claimed aspects and implementations. The drawings provide illustration and a further understanding of the various aspects and implementations and are incorporated in and constitute a part of this specification.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). The operations described in this specification can be implemented as operations performed by a data processing apparatus on data stored on one or more computer-readable storage devices or received from other sources.

The terms "computing device" or "component" encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs (e.g., components of the probe 104 or the data processing system 110) to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks. The processor and the memory can be supplemented by, or incorporated in, special purpose logic circuitry.

While operations are depicted in the drawings in a particular order, such operations are not required to be performed in the particular order shown or in sequential order, and all illustrated operations are not required to be performed. Actions described herein can be performed in a different order. The separation of various system components does not require separation in all implementations, and the described program components can be included in a single hardware or software product.

The phraseology and terminology used herein is for the purpose of description and should not be regarded as limiting. Any references to implementations or elements or acts of the systems and methods herein referred to in the singular may also embrace implementations including a plurality of these elements, and any references in plural to any implementation or element or act herein may also embrace implementations including only a single element. Any implementation disclosed herein may be combined with any other implementation or embodiment.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A system, comprising:
a data processing system comprising one or more processors coupled with memory, the data processing system configured to:
  collect a plurality of network data packets from user equipment, network equipment, or monitoring equipment connected to a communications network;
  determine an order for executing a plurality of layer functions of a hierarchical network architecture based on a priority for each layer function, wherein the hierarchical network architecture comprises a first layer, a second layer, and a third layer, the first layer being a sensor layer, the second layer being a federated application layer, and the third layer being a data lake layer, and wherein the number of layer functions in the first layer is greater than the number of layer functions in the second layer, which is greater than the number of layer functions in the third layer;
  execute the plurality of layer functions according to the order using the plurality of network data packets and historical network data as input to generate network data associated with the communications network; and
  execute at least one machine learning model in the sensor layer using deep packet inspection data to adaptively filter traffic and detect security threats;
  adjust the communications network according to the generated network data.

2. The system of claim 1, wherein:
the first quantity of layer functions at the first layer comprises a traffic analysis layer function, a cloud threat detection layer function, an IDP engine layer function, a knowledge base framework layer function, and a threat intelligence feed layer function;
the second quantity of layer functions at the second layer comprises a threat detection layer function, a retrospective analysis layer function, an application mapping layer function, and an asset validation layer function; and the third quantity of layer functions at the third layer comprises an automated response layer function, a telemetry data layer function, and a threat intelligence correlation layer function.

3. The system of claim 1, wherein the network architecture is a hierarchical adaptive service intelligence (ASI) architecture, a hierarchical deep packet inspection (DPI) architecture, or a combination thereof, wherein the ASI architecture comprises four layers.

4. The system of claim 1, wherein the order for executing the plurality of layer functions comprises instructions to:
  first, executing the first quantity of layer functions at the first layer;
  second, executing the second quantity of layer functions at the second layer; and
  third, executing the third quantity of layer functions at the third layer.

5. The system of claim 1, wherein the data processing system is further configured to:
  execute each layer function of each quantity of layer functions at each layer separately from other layer functions at each layer.

6. A method, comprising:
collecting, by one or more processors, a plurality of network data packets from user equipment, network equipment, or monitoring equipment connected to a communications network;
determining, by the one or more processors, an order for executing a plurality of layer functions of a hierarchical network architecture based on a priority for each layer function, wherein the hierarchical network architecture comprises a first layer, a second layer, and a third layer, the first layer being a sensor layer, the second layer being a federated application layer, and the third layer being a data lake layer, and wherein the number of layer functions in the first layer is greater than the number of layer functions in the second layer, which is greater than the number of layer functions in the third layer;
executing, by the one or more processors, the plurality of layer functions according to the order using the plurality of network data packets and historical network data as input to generate network data associated with the communications network; and
executing, by the one or more processors, at least one machine learning model in the sensor layer using deep packet inspection data to adaptively filter traffic and detect security threats;
adjusting, by the one or more processors, the communications network according to the generated network data.

7. The method of claim 6, wherein:
the first quantity of layer functions at the first layer comprises a traffic analysis layer function, a cloud threat detection layer function, an IDP engine layer function, a knowledge base framework layer function, and a threat intelligence feed layer function;
the second quantity of layer functions at the second layer comprises a threat detection layer function, a retrospective analysis layer function, an application mapping layer function, and an asset validation layer function; and
the third quantity of layer functions at the third layer comprises an automated response layer function, a telemetry data layer function, and a threat intelligence correlation layer function.

8. The method of claim 6, wherein the network architecture is a hierarchical adaptive service intelligence (ASI)

architecture, a hierarchical deep packet inspection (DPI) architecture, or a combination thereof, wherein the ASI architecture comprises four layers.

9. The system of claim 1, wherein the order for executing the plurality of layer functions comprises instructions to:

first, executing the first quantity of layer functions at the first layer;

second, executing the second quantity of layer functions at the second layer; and third, executing the third quantity of layer functions at the third layer.

10. The method of claim 6, further comprising:

executing, by the one or more processors, each layer function of each quantity of layer functions at each layer separately from other layer functions at each layer.

11. The system of claim 1, wherein the data processing system is further configured to:

execute the plurality of layer functions at the first layer to filter noise from the plurality of network data packets before executing the plurality of layer functions at the second layer, thereby reducing a quantity of data processed at the second layer and the third layer.

12. The system of claim 1, wherein the hierarchical network architecture is configured to reduce mean time to know (MTTK) for detecting security threats by executing the plurality of layer functions at the first layer in real-time and executing the plurality of layer functions at the second layer and the third layer on aggregated data from the first layer.

13. The system of claim 1, wherein:

the first layer comprises a traffic analysis layer function that analyzes packet headers and payload data to identify traffic patterns;

the second layer comprises a threat detection layer function that correlates the traffic patterns identified by the first layer with known threat signatures; and the third layer comprises a threat intelligence correlation layer function that correlates detected threats with external threat intelligence feeds.

14. The system of claim 1, wherein the data processing system is further configured to:

store metadata and packet decodes from the plurality of network data packets at the first layer for retrospective analysis by the second layer.

15. The system of claim 1, wherein the at least one machine learning model comprises an ASI Flow machine learning model that conducts network behavioral analysis to generate deterministic signatures that reduce false positives.

16. The system of claim 1, wherein the data processing system is further configured to:

convert raw network data packets into layer 2-7 metadata using Deep Packet Inspection and Adaptive Service Intelligence (ASI) at the first layer; and provide the layer 2-7 metadata to the second layer and the third layer for analysis.

17. The system of claim 1, wherein the data processing system is further configured to:

match indicators of compromise (IoCs) from a threat intelligence feed at the first layer;

match Suricata-based rules and signatures at the first layer; and when a threat is detected at the first layer, map the threat to known MITRE ATT&CK tactics, techniques, and procedures (TTPs) for analysis at the second layer.

18. The system of claim 1, wherein the hierarchical network architecture is an Omnis network security architecture comprising:

network instrumentation at the first layer that performs deep packet inspection to convert raw packets into metadata;

network instrumentation at the second layer that performs federated application analysis; and a data lake at the third layer that stores and analyzes aggregated network data.

19. The system of claim 1, wherein the data processing system is further configured to:

conduct forensic investigation at the second layer using the historical network data stored at the first layer to validate threats detected in real-time and reduce mean time to repair (MTTR).

* * * * *